Oct. 9, 1934.　　　　　E. MAROT　　　　　1,976,180
SHAKING SIEVE
Filed Jan. 6, 1931
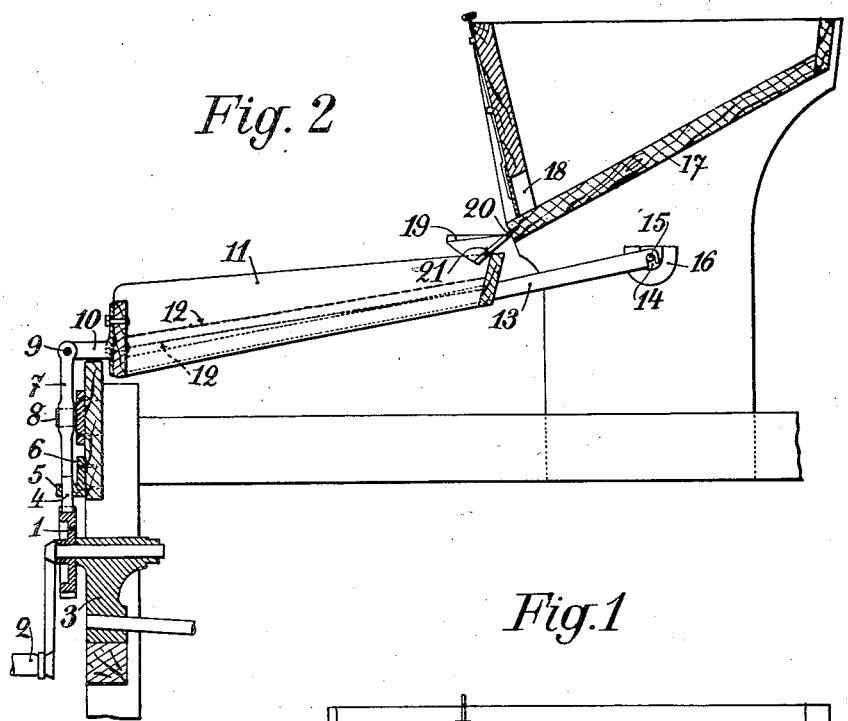
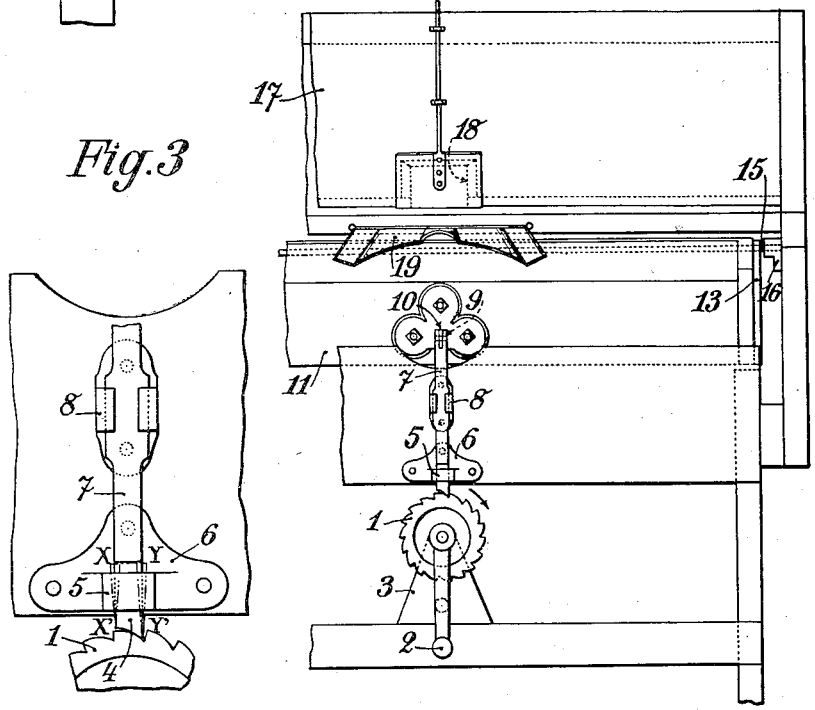

Patented Oct. 9, 1934

1,976,180

UNITED STATES PATENT OFFICE 1,976,180

SHAKING SIEVE

Emile Marot, Niort, France

Application January 6, 1931, Serial No. 506,999
In France January 16, 1930

3 Claims. (Cl. 209—254)

This invention relates to a shaking sieve and has for object various improvements allowing to increase its efficiency and the perfection of the sifting.

The systems actually used in sifting and sorting apparatus have the inconvenience of easily wedging and of causing on one side of the apparatus accumulations of material which are sifted with difficulty.

The device serving to actuate the sieve comprises a ratchet wheel the teeth of which push back, in opposition to the action of an antagonistic spring or of gravity alone, a link sliding in a guide and pivoted on the sieve; according to this invention, a movable intermediate member is freely interposed between the link and the teeth of the ratchet wheel in order to avoid the prejudicious effect of the oblique reactions due to the inclination of the teeth. The sieve is provided with two side longitudinal bearers which surround it and rest on a fixed axis located at a certain distance behind the sieve, so that all the parts of the sieve thus have a relatively great amplitude of oscillation.

On the other hand, the distributor feeding the sieve is secured to the hopper by a hinge and has a convex shape allowing it to ensure a fan-shaped delivery giving a regular distribution throughout the width of the sieve.

The accompanying drawing illustrates, by way of example, a preferred form of carrying out the subject-matter of the invention.

Figure 1 is an end elevation of part of the apparatus.

Fig. 2 is a vertical section of the entire apparatus.

Fig. 3 is a detail elevation of the system controlling the movement of the apparatus.

The ratchet wheel 1 driven by the crank 2 and mounted on the frame 3, receives a clockwise rotary movement; this movement is transmitted to a presser foot 4 freely moving in a slide-block 5 secured to the support 6 rigid with the frame, and this presser foot transmits in its turn the movement to the link 7, sliding in a guide 8 and pivoted at 9 on a supoprt 10 secured by bolts to the sieve 11.

This sieve 11, enclosing several superposed sieves 12, 12, is laterally provided with two longitudinal bearers 13, 13 which surround it and at the end of which mortices 14, 14 are provided; these latter frictionally fit on a link 15 carried by supports 16, 16, secured on the sides of the hopper 17 well behind the falling point of the bodies to be sorted.

The material to be sifted escapes, through an aperture 18 provided at the base of the hopper, on a distributor 19 of convex shape, secured to the hopper by a hinge 20 and resting at 21 on the sieve.

The operation of the apparatus is as follows:

The movement of rotation imparted to the ratchet wheel 1, communicates to the presser foot 4 a vertical trepidation or shaking movement; if the apparatus is not placed on a horizontal ground, or under the effect of the returning movement from left to right produced by the friction of the presser foot on the teeth of the ratchet, the latter can take the positions XX' or YY' indicated in Fig. 3, without this causing any wedging of the link 7 in its guide 8; this link transmits to the sieve a to-and-fro movement corresponding to that of the presser foot.

The pivot of the sieve being situated at 15 well behind the falling point of the material to be sorted, the trepidation or shaking movement imparted to the sieve is relatively considerable throughout the extent of the latter; a powerful trepidation or shaking movement is thus imparted to the distributor 19, this allowing to give to the latter a convex shape ensuring a fan-shaped delivery of the material to be sorted.

The main advantages of this apparatus consist therefore in that it can operate without risk of wedging, even on an uneven ground, it avoids the accumulations of material on one side of the hopper notwithstanding the obliquity of the stresses supported by the presser foot, and it ensures a better delivery as well as a more powerful sifting of the material, this materially increasing the efficiency of the apparatus.

I claim:

1. In a clod-breaking and sifting apparatus for grains, the combination of a sieve, a feeding hopper, an oscillating distributing element adapted to receive the grain from the hopper and to allow it to fall on the sieve, the axis of oscillation of this distributing element being placed near the outlet orifice of the hopper, and the said element resting on the rear edge of the said sieve, two longitudinal bearers secured to the sides of the sieve and extending far behind the latter, fixed pivots on which rest the rear ends of the said longitudinal bearers, and means for imparting a rapid up and down movement to the front end of the said sieve.

2. In a clod-breaking and sifting apparatus for grains, the combination of a grain hopper, an oscillating sieve having a frame and two superposed sifters in this frame, two longitudinal bearers secured to the sides of the frame and extending far behind the latter, fixed pivots on which bear the rear ends of the said longitudinal bearers, means for imparting a rapid up and down movement to the front end of the said sieve and an oscillating distributor pivoted about a fixed horizontal axis at the base of the hopper and resting on the rear part of the frame of the sieve, this distributor having its pouring edge at a certain level above the sifting element of the sieve and being adapted to follow the up and down movement of the sieve.

3. In a clod-breaking and sifting apparatus for grains, the combination of an oscillating sieve, longitudinal bearers secured to the sides of this sieve and extending far behind the latter, fixed pivots on which rest the rear ends of the said longitudinal bearers, and means for imparting a rapid up and down movement to the said sieve, these means comprising a vertical rod pivotally connected to the front end of the sieve, a fixed slide in which the said rod slides, another short rod on the top of which freely rests the lower end of the preceding rod, another fixed slide in which the said short rod slides, and a rotary toothed wheel on the teeth of which the said short rod freely rests, the last mentioned slide being sufficiently wide in order that the said short rod may slightly rock therein under the thrust of the teeth of the said wheel and transversely slide against the underside of the first sliding rod.

EMILE MAROT.